(12) United States Patent
Hone et al.

(10) Patent No.: US 8,571,165 B2
(45) Date of Patent: *Oct. 29, 2013

(54) NEUTRON ABSORBER CONSISTING OF REFRACTORY METAL INFUSED WITH DISCRETE NEUTRON ABSORBER

(75) Inventors: Michael J. Hone, New Alexandria, PA (US); Carroll J. Long, Jr., Columbia, SC (US); Radu Pomirleanu, Sewickley, PA (US); Mark P. Goldenfield, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 20 days.

This patent is subject to a terminal disclaimer.

(21) Appl. No.: 13/226,552

(22) Filed: Sep. 7, 2011

(65) Prior Publication Data

US 2012/0281805 A1    Nov. 8, 2012

Related U.S. Application Data

(62) Division of application No. 12/028,215, filed on Feb. 8, 2008, now Pat. No. 8,031,826.

(51) Int. Cl.
*G21D 3/00* (2006.01)
*G21D 3/10* (2006.01)

(52) U.S. Cl.
USPC ........................................................ 376/327

(58) Field of Classification Search
None
See application file for complete search history.

(56) References Cited

U.S. PATENT DOCUMENTS

| 3,307,958 A | 3/1967 | Earl |
| 3,527,948 A | 9/1970 | Rhines et al. |
| 3,983,755 A | 10/1976 | Collins |
| 4,079,236 A | 3/1978 | Graham et al. |
| 4,587,087 A * | 5/1986 | Radford et al. ............... 376/417 |
| 4,642,216 A * | 2/1987 | Orr et al. ....................... 376/327 |
| 4,659,540 A | 4/1987 | Cheng et al. |
| 4,762,675 A | 8/1988 | Feild, Jr. |
| 4,780,268 A | 10/1988 | Papai et al. |
| 5,064,607 A * | 11/1991 | Miller et al. .................. 376/333 |
| 5,706,318 A | 1/1998 | Ledford et al. |
| 5,742,655 A | 4/1998 | Hertz et al. |
| 6,125,912 A | 10/2000 | Branagan et al. |
| 6,636,580 B2 * | 10/2003 | Murakami et al. ............ 376/333 |
| 2007/0036260 A1 | 2/2007 | Fetterman et al. |
| 2007/0064860 A1 | 3/2007 | Kusui et al. |

* cited by examiner

*Primary Examiner* — Jack W Keith
*Assistant Examiner* — Sean P Burke
(74) *Attorney, Agent, or Firm* — Joseph C. Spadacene; Westinghouse Electric Company, LLC

(57) ABSTRACT

The present invention provides a gray rod control assembly for a nuclear reactor. The gray rod control assembly includes a spider assembly having a plurality of radial extending flukes and a plurality of gray rod assemblies coupled to the flukes of the spider assembly. Each of the gray rod assemblies includes an elongated tubular member, a first end plug, a second end plug, and a neutron absorber. The neutron absorber includes a matrix of refractory metal fabricated to be porous into which a metal or metal alloy is infused. The neutron absorber is distributed among a plurality of the gray rod assemblies.

12 Claims, 3 Drawing Sheets

NEUTRON ABSORBER CONSISTING OF REFRACTORY METAL INFUSED WITH DISCRETE NEUTRON ABSORBER

CROSS REFERENCE TO RELATED APPLICATION

This application is a divisional of patent application Ser. No. 12/028,215, filed Feb. 8, 2008, and claims the benefit of the filing date thereof

BACKGROUND OF THE INVENTION

1. Field of the Invention

The present invention relates generally to nuclear reactors and, more particularly, to an improved neutron absorber material contained in gray rod assemblies of gray rod control assemblies (GRCAs).

2. Description of the Prior Art

The fuel assemblies of modern reactor cores typically employ two types of rod control assemblies to control reactivity, rod cluster control assemblies (RCCAs) and gray rod control assemblies (GRCAs). Both consist of a plurality of neutron-absorbing rods fastened at their top ends to a common hub or spider assembly. The body of the rods generally comprises a stainless steel tube which encapsulates a neutron-absorbing material, such as a pure silver absorber material or a silver-indium-cadmium alloy absorber material, and the rods are slid within tubular guide thimble tubes of the fuel assembly with a control drive mechanism near the top of the spider assembly operating to control the movement of the rods within the thimble tubes. In this manner, the controlled insertion and extraction of the rods generally controls the rate of reactor power produced.

The power produced by the reactor of a nuclear power plant is generally controlled by raising or lowering control rod assemblies within the reactor core, and the change in reactor power output required in order to accommodate a change in the demand for electrical output from the electrical power plant is commonly referred to as load follow. As described, for example, in U.S. Pat. No. 4,079,236, load follow presents many operating issues. For instance, in a pressurized water reactor (PWR) during load follow, reactivity must be controlled and axial power distribution changes in the core in response to the power level change, must be addressed.

Typically, GRCAs are used in load follow maneuvering because they comprise reduced worth control rods, commonly referred to in the art as "gray" rods. Gray rods are known to provide a mechanical shim (MSHIM) reactivity mechanism as opposed to a chemical shim, which requires changing the concentration of soluble boron in the reactor coolant. Thus, the use of gray rods minimizes the need for processing the primary reactor coolant on a daily basis and, therefore, greatly simplifies operations. More specifically, GRCA designs typically consist of twenty-four rodlets fastened at their top ends to the spider. Of the twenty-four rodlets within the cluster, only four rods are absorber rods, and the neutron-absorber material encapsulated within the absorber rods typically consists of about 80% silver, about 15% indium, and about 5% cadmium. Such a design poses several disadvantages.

Among the disadvantages of known GRCA designs, is the fact that indium and cadmium have relatively large neutron cross-sections, which result in their depletion over a relatively short period of time. Silver depletes somewhat more slowly than indium and cadmium, and ultimately transmutes into other non-absorbing isotopes of cadmium. As a result of continued decrease in the rod worth, the GRCAs become less effective in controlling the reactivity of the reactor during load follow. In addition, elemental transmutation of silver and indium to other metals leads to changes in absorber material properties and excessive absorber swelling, which has been a recognized problem in the industry for many years. This undesirably leads to frequent GRCA replacement.

A second disadvantage relates to changes in the local rod power for fuel rods which are adjacent to the four guide thimbles that contain the absorber rods. Specifically, because the absorber material is localized to four rodlets, a rapid change in power, commonly referred to as the delta-power of the fuel rods, occurs, for example, during a rod pull. A rod pull is the process of extracting the GRCA from the fuel assembly, and in GRCA designs it results in a delta-power spike.

There exists a need, therefore, for an improved neutron absorber material for gray rod assemblies which overcomes the aforementioned disadvantages typically found in known GRCAs.

SUMMARY OF THE INVENTION

This need and others are satisfied by the present invention, which is directed to an improved neutron absorbing material for gray rod control assemblies (GRCAs), which is mechanically self-supporting up to substantially higher temperatures than those at which pure silver or silver-indium-cadmium alloy retains its shape, while being spatially uniform in its ability to absorb neutrons.

In one aspect of the present invention, there is provided a gray rod assembly for a gray rod control assembly of a nuclear reactor. The nuclear reactor includes a number of fuel assemblies each having a plurality of elongated nuclear fuel rods supported in an organized array by a number of substantially transverse support grids, and a plurality of guide thimbles disposed through the support grids and along the fuel rods. The gray rod control assembly includes a spider assembly having a plurality of radially extending flukes and being structured to move each gray rod assembly within one of the guide thimbles in order to control the rate of power produced by the nuclear reactor. The gray rod assembly comprises an elongated tubular member having a first end, a second end, an inner diameter, and a length; a first end plug coupled to the first end of the elongated tubular member, and being structured to facilitate insertion of the elongated tubular member into one of the guide thimbles of the fuel assembly; a second end plug coupled to the second end of the elongated tubular member, and being structured to be coupled to one of the radially extending flukes of the spider assembly of the gray rod control assembly; and a neutron absorber comprised of a matrix of refractory metal fabricated to be porous into which a neutron absorbing metal or metal alloy is infused. The neutron absorber is disposed as a plurality of segments within most of the elongated tubular member, having a diameter which is relatively equivalent in diameter to the elongated tubular member, and a length which is shorter than the length of the elongated tubular member, in order to minimize the exposed surface area of the neutron absorber to radiation when the tubular member is inserted into the thimble and to allow the tubular member to flex, if necessary. The neutron absorber is distributed among a plurality of the gray rod assemblies.

In another aspect of the present invention, there is provided a gray rod control assembly for a nuclear reactor. The nuclear reactor includes a plurality of fuel assemblies each having a plurality of elongated nuclear fuel rods supported in an organized array by a number of substantially transverse support grids, and a plurality of guide thimbles disposed through the support grids and along the fuel rods. The gray rod control assembly comprises a spider assembly having a plurality of radially extending flukes; and a plurality of gray rod assemblies coupled to the flukes of the spider assembly, the spider assembly being structured to move each gray rod assembly within one of the guide thimbles in order to control the rate of power produced by the nuclear reactor. Each of the gray rod assemblies comprises an elongated tubular member having a first end, a second end, an inner diameter, and a length; a first end plug coupled to the first end of the elongated tubular member, and being structured to facilitate insertion of the elongated tubular member into one of the guide thimbles of the fuel assembly; a second end plug coupled to the second end of the elongated tubular member, and being structured to be coupled to one of the radially extending flukes of the spider assembly; and a neutron absorber.

The neutron absorber may comprise a matrix of refractory metal fabricated to be porous into which a neutron absorbing metal or metal alloy is infused. The neutron absorber is disposed as a plurality of segments within the elongated tubular member generally toward the first end. The neutron absorber has a diameter that is relatively equivalent in diameter to the elongated tubular member, and a length that is substantially shorter than the length of the elongated tubular member. The neutron absorber is distributed among a plurality of the gray rod assemblies.

In a further aspect of the present invention, there is provided a nuclear reactor, comprising a plurality of elongated nuclear fuel rods each having an extended axial length; a number of substantially transverse support grids spaced along the axial length of the fuel rods in order to hold the fuel rods in an organized array; a plurality of guide thimbles disposed through the support grids and along the fuel rods; and a gray rod control assembly including a spider assembly having a plurality of radially extending flukes, and a plurality of gray rods assemblies coupled to the flukes, the advanced gray rod control assembly being structured to move each of the gray rod assemblies within one of the guide thimbles in order to control the rate of power produced by the nuclear reactor. Each of the gray rod assemblies comprises an elongated tubular member having a first end, a second end, an inner diameter, and a length, a first end plug coupled to the first end of the elongated tubular member, the first end plug being tapered in order to facilitate insertion of the elongated tubular member into one of the guide thimbles of the fuel assembly, a second end plug coupled at one end to the second end of the elongated tubular member, and at the other end to one of the radially extending flukes of the spider assembly, and a neutron absorber.

The neutron absorber may comprise a matrix of refractory metal fabricated to be porous into which a neutron absorbing metal or metal alloy is infused. The neutron absorber is disposed as a plurality of segments generally filling most of the elongated tubular member. The neutron absorber has a diameter that is relatively equivalent to the inner diameter of the elongated tubular member. The neutron absorber is distributed among a plurality of the gray rod assemblies.

The neutron absorber is comprised preferably of between about 40% to about 80% refractory metal and between about 20% to about 60% metal or metal alloy, more preferably of between about 50% to about 70% refractory metal and between about 30% to about 50% metal or metal alloy, and most preferably of about 65% refractory metal and about 35% metal or metal alloy.

Suitable refractory metals of the present invention include, without limitation, molybdenum, tungsten, niobium or zirconium.

An exemplary neutron absorber of the present invention includes, for example, a matrix of porous molybdenum as a refractory metal that is infused with silver or a silver-indium-cadmium alloy in the pore network of the refractory metal. The porous matrix of the refractory metal is accomplished, for example, by sintering.

The neutron absorber material of the present invention may be shaped, for example and without limitation, as cylindrical pellets such as right circular cylindrical pellets.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
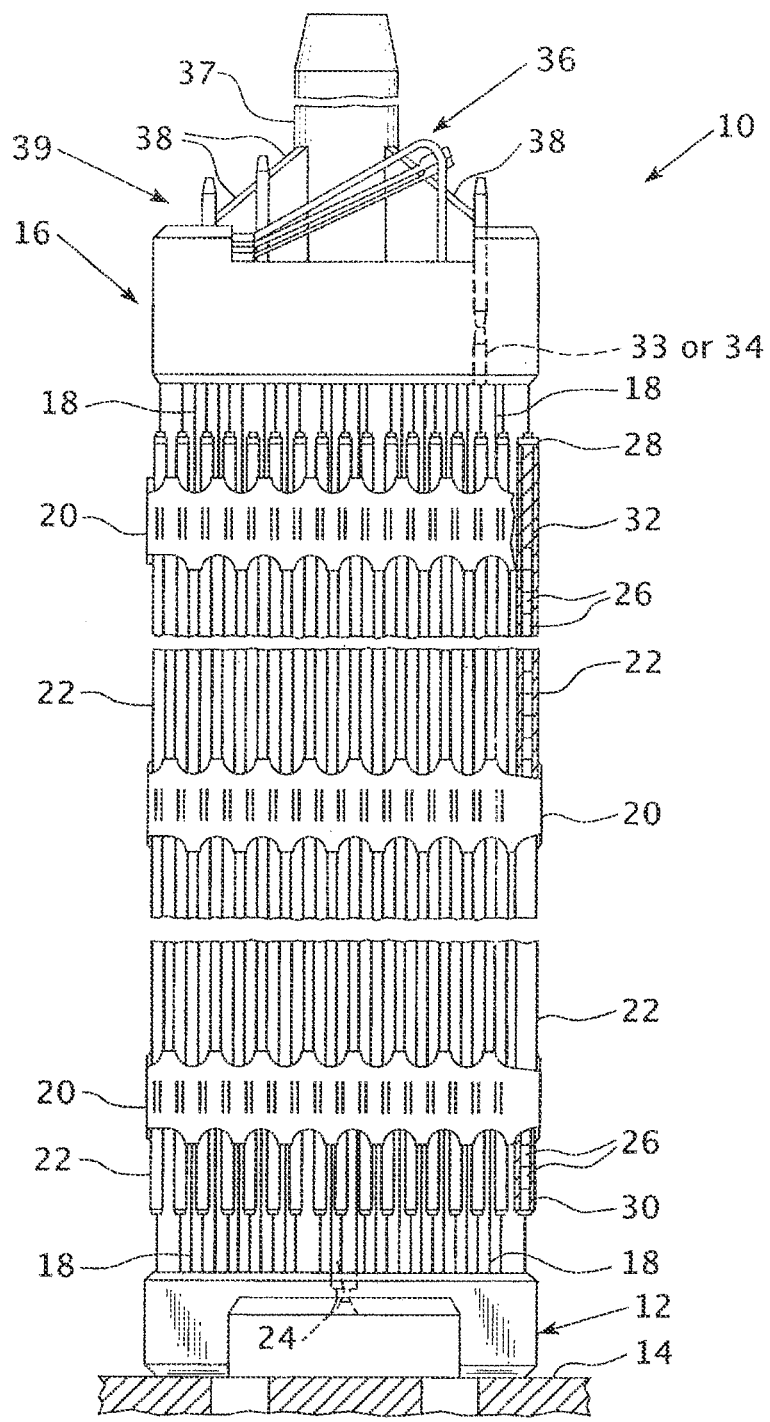
FIG. 1 is an elevational view of a fuel assembly, illustrated in vertically shortened form, and a control assembly therefore, partially shown in hidden line drawing.

For simplicity of disclosure, the invention will be described with reference to the pressurized water reactor (PWR) core design which is commercially known under the designation AP1000. The AP1000 is a Westinghouse Electric Company LLC reactor design. Westinghouse Electric Company LLC has a place of business in Monroeville, Pa. Reference to the AP1000 is provided for illustrative example purposes only and is not limiting upon the scope of the invention. It will, therefore, be appreciated that the exemplary GRCA design of the invention has application in a wide variety of other reactor designs.

Directional phrases used herein, such as, for example, upper, lower, top, bottom, left, right, and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall refer to one and more than one (i.e., a plurality).

Fuel Assembly

Referring now to the drawings and particularly to FIG. 1, there is shown an elevational view of a nuclear reactor fuel assembly, represented in vertically shortened form and being generally designated by reference numeral 10. The fuel assembly 10 is the type used in a pressurized water reactor (PWR) and has a structural skeleton which, at its lower end, includes a bottom nozzle 12 for supporting the fuel assembly 10 on a lower core support plate 14 in the core region of the nuclear reactor (not shown), a top nozzle 16 at its upper end, and a number of guide tubes or thimbles 18 which extend longitudinally between and are rigidly attached at opposite ends, to the bottom and top nozzles 12 and 16.

The fuel assembly 10 further includes a plurality of transverse grids 20 axially-spaced along and mounted to the guide thimble tubes 18 and, an organized array of elongated fuel rods 22 transversely-spaced and supported by the grids 20. The assembly 10 also has an instrumentation tube 24 located in the center thereof and extending between and mounted to the bottom and top nozzles 12 and 16. In view of the foregoing arrangement of parts, it will be understood that the fuel assembly 10 forms an integral unit capable of being conveniently handled without damaging the assembly parts.

As previously discussed, the array of fuel rods 22 in the fuel assembly 10 are held in spaced relationship with one another by the grids 20 which are spaced along the fuel assembly length. Each fuel rod 22 includes nuclear fuel pellets 26 and is closed at its opposite ends by upper and lower end plugs 28 and 30. The pellets 26 are maintained in a stack by a plenum spring 32 disposed between the upper end plug 28 and the top of the pellet stack. The fuel pellets 26, composed of fissile material, are responsible for creating the reactive power of the reactor. A liquid moderator/coolant such as water or water containing boron, is pumped upwardly through a plurality of flow openings in the lower core plate 14 to the fuel assembly. The bottom nozzle 12 of the fuel assembly 10 passes the coolant upwardly through the guide thimbles 18 and along the fuel rods 22 of the assembly in order to extract heat generated therein for the production of useful work. To control the fission process, a number of control rods 33 without neutron absorber and control rods 34 with neutron absorber are reciprocally moveable in the guide thimbles 18 located at predetermined positions in the fuel assembly 10. A spider assembly 39 positioned above the top nozzle 16 supports the control rods 33, 34.

Figure 2B:
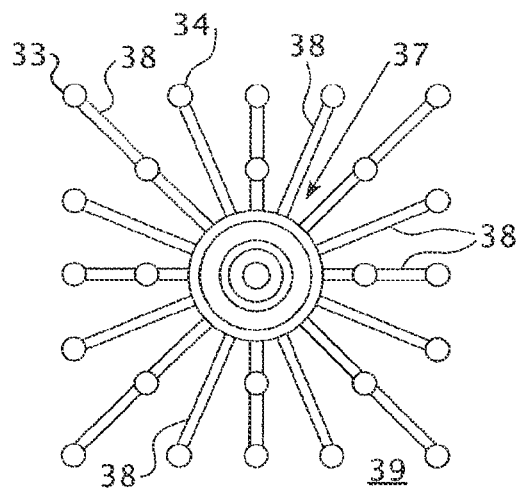
FIG. 2B is a top plan view of the control rod spider assembly for the control assembly of FIG. 2A.
Figure 2A:
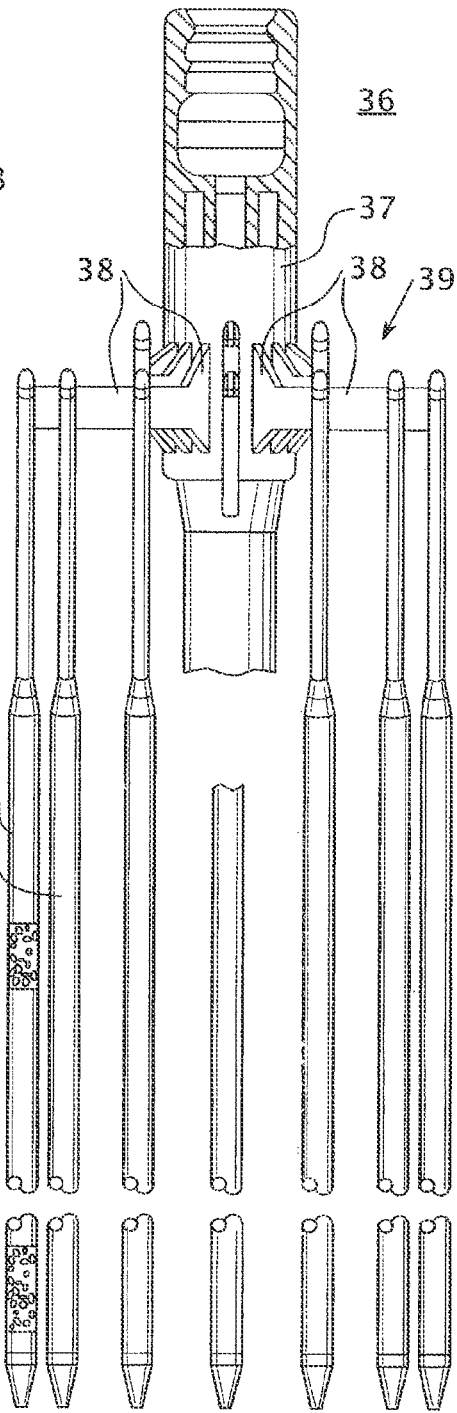
FIG. 2A is a partially sectioned elevational view of the control assembly of FIG. 1, which has been removed from the fuel assembly.

FIGS. 2A and 2B show the control rod assembly 36 after it has been removed from the fuel assembly 10 of FIG. 1. Generally, the control assembly 36 has an internally threaded cylindrical member 37 with a plurality of radially-extending flukes or arms 38, which comprise the spider assembly 39, best shown in FIG. 2B. As previously discussed, each arm 38 is interconnected to the control rods 33 without neutron absorber and control rods 34 with neutron absorber, such that the control rod assembly 36 is operable to move the control rods 33, 34 vertically within the guide thimbles 18 (FIG. 1) to thereby control the fission process in the fuel assembly 10 (FIG. 1), all in a well known manner. With the exception of the exemplary control rod assembly which comprises a gray control rod assembly (GRCA) 36 having gray rod assemblies 34 with improved neutron absorbing material, which will now be discussed, all of the foregoing is old and generally well known in the art.

Improved GRCA

Continuing to refer to FIGS. 2A and 2B, the general control rod configuration will now be described. As previously stated, in order to take advantage of the MSHIM capabilities afforded by low worth or gray rods, known control rod assemblies, such as the existing control assemblies for the Westinghouse Electric Company LLC AP1000 reactor, employ GRCAs. However, while the GRCA design for the current AP1000 reactor design has twenty-four rods which are generally configured as shown in FIG. 2B, as mentioned hereinbefore, twenty of the twenty-four rods are stainless steel (e.g., without limitation, SS-304) water displacing rods and only four of the rods are neutron-absorber rods. Therefore, essentially all of the neutron absorber material is localized and isolated in only four rod locations within the GRCA.

Additionally, in the existing AP1000 design, the absorber material comprises an Ag—In—Cd absorber consisting of about 80% silver, about 15% indium, and about 5% cadmium. This absorber material is consistent with known standard full-strength rod cluster control assemblies (RCCAs), in which all twenty-four rods are Ag—In—Cd. As noted, indium and cadmium are known to rapidly deplete. RCCAs spend a minimal amount of time in the core during power operation. Therefore, such depletion is not an issue. However, for the AP1000 mechanical shim (MSHIM) operation, for example, the GRCAs are expected to reside in the core for up to half of the operating cycle. Under these operating conditions, the existing GRCA design would need to be replaced periodically due to rapid absorber depletion. As will be discussed in detail herein, among other benefits, the improved GRCA design of the invention overcomes this rapid depletion disadvantage and also substantially avoids the undesirable local power spike experienced when traditional GRCA having four gray rod assemblies with neutron absorbing material is pulled from the core.

Two-dimensional multi-group transport theory simulations also demonstrate that the exemplary neutron absorber of the invention, comprised of, for example and without limitation, a molybdenum refractory metal infused with silver, compared to gray rod designs composed of thin wires of pure silver metal or Ag—In—Cd surrounded by a steel spacer sleeve and a clad with approximately equal reactivity worth, is superior both in terms of depletion lifetime and intra-assembly peaking. Depletion calculations indicate that approximately one-third of the silver in the exemplary silver-molybdenum neutron absorber of the invention transmute to cadmium-108 or -110 at the end of its targeted lifetime. The molybdenum percentage, however, remains essentially constant over the targeted life of the gray rod assembly 34 (FIGS. 2A, 2B), with no significant quantities of other chemical species produced due to irradiation of the molybdenum. Hence, the material composition of the irradiated silver-molybdenum neutron absorber of the invention is expected to remain fairly similar to the initial composition. In contrast, depletion calculations for small diameter applications of Ag—In—Cd alloy indicate that the relative changes in material composition due to irradiation are significantly larger in these materials for the same targeted lifetime.

Figure 3:
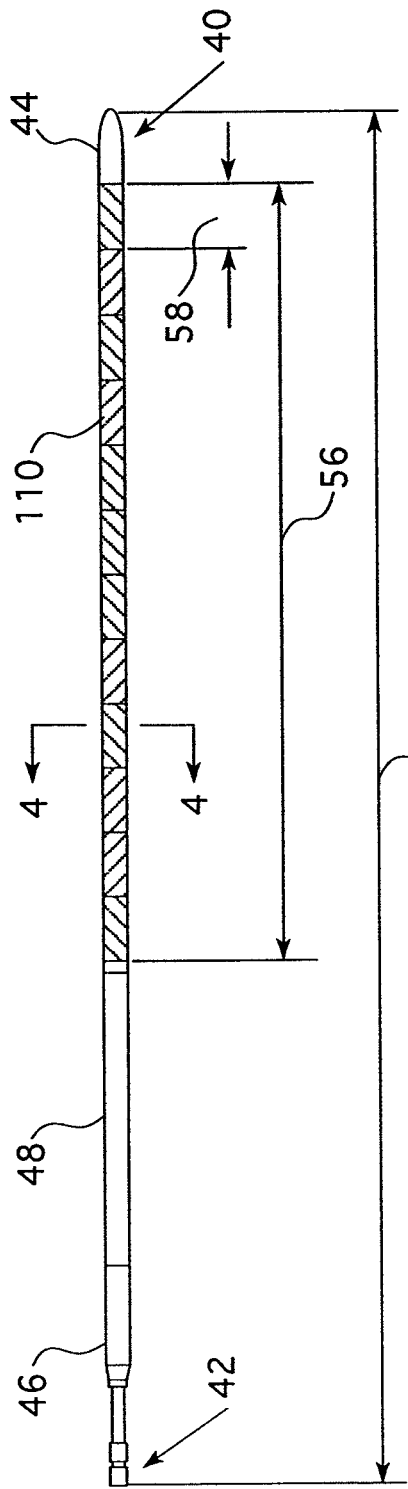
FIG. 3 is a partially sectioned elevational view of a gray rod assembly not to scale in accordance with the invention.
Figure 4:
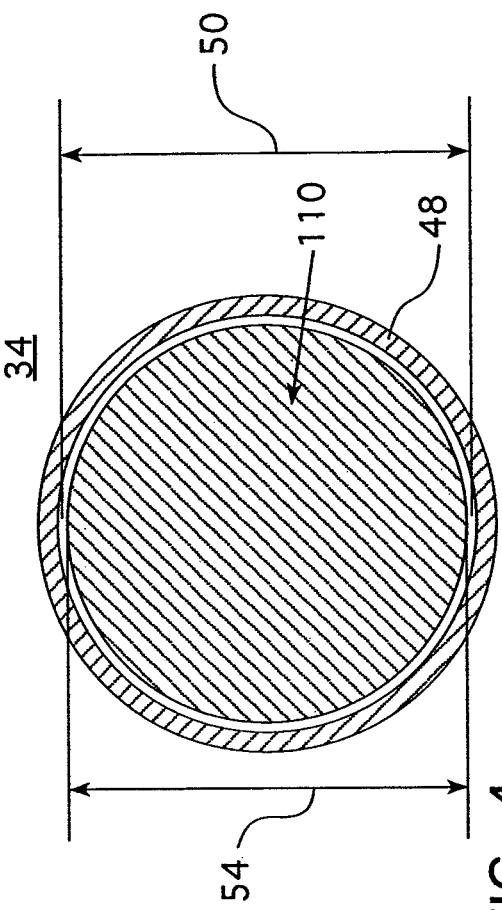
FIG. 4 is a cross-sectional view taken along line 4-4 of FIG. 3.

A further understanding of the aforementioned absorber depletion issue will be had with reference to FIGS. 3 and 4, which show the gray rod assembly 34 with neutron absorber 110 of the invention. As shown in FIG. 3, the gray rod assembly 34 generally includes a first end 40 which, as oriented in the core (FIG. 1), is the bottom end, and a second end 42 (e.g., top end from the perspective of FIG. 1). The first or bottom end 40 has a tapered end plug 44. Such tapered design facilitates guided insertion of the rod 34 into the thimble tube 18 (FIG. 1) of the fuel assembly 10 (FIG. 1). The second or top end 42 has a top end plug 46 which is structured to engage and secure to the spider assembly 39 (best shown in FIG. 2A) in a known manner (e.g., without limitation, a complementary male/female fastening arrangement). An elongated tubular member 48 extends between the top and bottom end plugs 46, 44. The exemplary tubular member 48 is a stainless steel tube made from 304-stainless steel, although tubes made from other known or suitable alternative materials are contemplated. In the example shown and discussed herein, the inner diameter 50 of the tube 48 (FIG. 4) is about 0.38 inches (0.97 centimeters). However, it will be appreciated that the concepts of the invention are equally applicable for gray rod assemblies 34 having any suitable inner diameter for use in a wide variety of reactors.

The neutron absorber material 110 comprises a matrix of porous refractory metal infused with a neutron absorbing metal or metal alloy. The refractory metal is fabricated, for example, by compacting and sintering metal powder so as to result in a continuous pore network, which then is infused with a neutron absorbing metal or metal alloy. The neutron absorber 110 preferably is between about 40% to about 80% refractory metal and between about 20% to about 60% neutron absorbing metal or metal alloy, more preferably between about 50% to about 70% refractory metal and between about 30% to about 50% neutron absorbing metal or metal alloy, and most preferably about 65% refractory metal and about 35% neutron absorbing metal or metal alloy. The refractory metal may be, for example, molybdenum, tungsten, niobium or zirconium. As discussed above, preferably, the refractory metal is molybdenum and the metal that is infused in the refractory metal preferably is, for example, silver. Alternatively, a neutron absorbing metal alloy such as, for example, Ag—In—Cd, may be infused in the refractory metal.

The neutron absorber material 110 generally is disposed within most of the tube 48 in a plurality of segments 58 therein, shown not in scale in FIG. 3, in which each segment 58 comprises the neutron absorber 110, preferably in the form, for example, of cylindrical pellets. Segmentation of the neutron absorber 110 in the elongated tubular member 48 allows for the elongated tubular member 48 to be flexible so as to reduce frictional forces between the elongated tubular member 48 and the thimble tubes 18, which reduces the likelihood of incomplete insertion of the gray rod assemblies 34 in the thimble tubes 18.

As best shown in the cross-sectional view of FIG. 4, the diameter 54 of the exemplary neutron absorber material 110 is relatively equivalent in diameter to the inner diameter 50 of the rod tube 48. The length 56 of the absorber 110 in the example of FIG. 3 is about 166 inches (421.64 centimeters). Although, as with the other dimensions of the gray rod 34, this measurement could vary without departing from the scope of the invention.

The refractory metal of the invention serves as a structural component for the neutron absorbing material infused therein, i.e., the silver metal or silver-indium-cadmium metal alloy is infused in the refractory metal in relatively small amounts in the pore network of the refractory metal.

The exemplary gray rod assembly 34 of the invention provides an extended nuclear lifetime through use of the exemplary neutron absorber 110. This is due to the low percentage of absorber metal, for example, about 35% silver, infused in the porous matrix of refractory metal, for example, about 65% molybdenum. Specifically, the low percentage of absorber metal resists bulk boiling during conditions of high local power density, absorber swelling and resultant clad cracking. The overall GRCA 36 design of the invention also generally improves fuel rod 22 linear heat rate change margins during GRCA 36 maneuvers.

In an embodiment, of the twenty-four rods 33, 34 in the exemplary GRCA 36, about, for example, twelve rods 34 contain the exemplary neutron absorber 110 and the remaining rods 33 do not contain the exemplary neutron absorber 110, as opposed to localizing the absorber in only four rods, as in the existing AP1000 design discussed hereinbefore. However, it will be appreciated that the concepts of the invention are equally applicable for gray rods 33, 34 having any other suitable arrangement of neutron absorber-containing rods 34 and rods 33 without neutron absorber.

In addition, the neutron absorber 110 may be distributed evenly over about the rods 34, which reduces the change in local fuel rod power (delta-power) when the GRCA 36 is removed from the core, which in turn improves operating margins. Further, distributing the absorber material 110 evenly over the rods 34 reduces the amount of absorber 110 in each rod 34, which reduces the amount of heat generated in each rod 34 and resists the risk of bulk boiling in the thimbles 18 under high local power density conditions. The exact reduction in amount of absorber material 110, as compared with the four Ag—In—Cd absorbers of the current design, is not meant to be limiting upon the invention.

In view of the foregoing, the exemplary gray rod control assembly 36 has been redesigned to address and substantially overcome the aforementioned disadvantages in the art by including an entirely different absorber material 110 comprising a porous matrix of refractory metal infused with a neutron absorbing metal or metal alloy, a reduced amount of absorber 110 in the rods 34 containing the neutron absorber, distribution of the neutron absorber 110 in discrete segments 58 of the rods 34, and distribution of the neutron absorber 110 evenly among, for example, about twelve rods 34 of the twenty-four rods 33, 34.

What is claimed is:

1. A gray rod control assembly for a nuclear reactor, said nuclear reactor including a plurality of fuel assemblies each having a plurality of elongated nuclear fuel rods supported in an organized array by a number of substantially transverse support grids, and a plurality of guide thimbles disposed through said support grids and along said fuel rods, said gray rod control assembly comprising:
   a spider assembly having a plurality of radially extending flukes; and
   a plurality of gray rod assemblies coupled to said flukes of said spider assembly, said spider assembly being structured to move each gray rod assembly within one of said guide thimbles in order to control the rate of power produced by said nuclear reactor, wherein each of said gray rod assemblies comprises:
   an elongated tubular member having a first end, a second end, an inner diameter, and a length,
   a first end plug coupled to the first end of said elongated tubular member, and being structured to facilitate insertion of said elongated tubular member into one of said guide thimbles of said fuel assembly,
   a second end plug coupled to the second end of said elongated tubular member, and being structured to be coupled to one of said radially extending flukes of said spider assembly, and
   a neutron absorber comprised of a matrix of refractory metal selected from the group consisting of molybdenum, tungsten, niobium and mixtures thereof, fabricated to be porous into which silver is infused, wherein said neutron absorber is distributed among a plurality of said gray rod assemblies.

2. The gray rod control assembly of claim 1, wherein said neutron absorber is disposed as a plurality of segments within most of said elongated tubular member.

3. The gray rod control assembly of claim 1, wherein said neutron absorber has a diameter which is relatively equivalent to the diameter of said elongated tubular member.

4. The gray rod control assembly of claim 1, wherein said gray rod control assembly contains twenty-four gray rod assemblies and said neutron absorber is distributed among twelve gray rod assemblies of said twenty-four gray rod assemblies.

5. The gray rod control assembly of claim 1, wherein said neutron absorber is comprised of between about 40% to about 80% refractory metal and between about 20% to about 60% silver.

6. The gray rod control assembly of claim 1, wherein said neutron absorber is comprised of between about 50% to about 70% refractory metal and between about 30% to about 50% silver.

7. The gray rod control assembly of claim 1, wherein said neutron absorber is comprised of about 65% refractory metal and about 35% silver.

8. The gray rod control assembly of claim 1, wherein said refractory metal is molybdenum.

9. The gray rod control assembly of claim 1, wherein said neutron absorber in said plurality of segments disposed in said elongated tubular member is shaped as cylindrical pellets.

10. A nuclear reactor, comprising:
a plurality of elongated nuclear fuel rods each having an extended axial length;
a number of substantially transverse support grids spaced along the axial length of said fuel rods in order to hold said fuel rods in an organized array;
a plurality of guide thimbles disposed through said support grids and along said fuel rods; and
a gray rod control assembly including a spider assembly having a plurality of radially extending flukes, and a plurality of gray rods assemblies coupled to said flukes, said gray rod control assembly being structured to move each of said gray rod assemblies within one of said guide thimbles in order to control the rate of power produced by said nuclear reactor, wherein each of said gray rod assemblies comprises:
an elongated tubular member having a first end, a second end, an inner diameter, and a length,
a first end plug coupled to the first end of said elongated tubular member, said first end plug being tapered in order to facilitate insertion of said elongated tubular member into one of said guide thimbles of a fuel assembly,
a second end plug coupled at one end to the second end of said elongated tubular member, and at the other end to one of said radially extending flukes of said spider assembly, and
a neutron absorber comprised of a matrix of refractory metal selected from the group consisting of molybdenum, tungsten, niobium and mixtures thereof, fabricated to be porous into which silver is infused, said neutron absorber disposed as a plurality of segments within most of said elongated tubular member, said neutron absorber having a diameter which is relatively equivalent to the diameter of said elongated tubular member, wherein said neutron absorber is distributed among a plurality of said gray rod assemblies.

11. The nuclear reactor of claim 10, wherein said gray rod control assembly contains twenty-four gray rod assemblies and said neutron absorber is distributed among twelve gray rod assemblies of said twenty-four gray rod assemblies.

12. The nuclear reactor of claim 10, wherein said neutron absorber is comprised of about 65% molybdenum that is infused with about 35% silver.

* * * * *